United States Patent [19]
Krause et al.

[11] Patent Number: 5,650,696
[45] Date of Patent: Jul. 22, 1997

[54] METHOD AND APPARATUS FOR PROTECTION OF EHT AND/OR SCAN OUTPUT STAGES IN MULTISCAN DISPLAYS

[75] Inventors: Peter Krause; Aik Keong Ong, both of Singapore, Singapore

[73] Assignee: Apple Computer, Inc., Cupertino, Calif.

[21] Appl. No.: 505,424

[22] Filed: Jul. 21, 1995

[51] Int. Cl.$^6$ ................................................. H01J 29/70
[52] U.S. Cl. ........................... 315/411; 348/372; 315/408
[58] Field of Search ............................. 315/411, 408; 363/21, 372

[56] References Cited

U.S. PATENT DOCUMENTS

| | | | |
|---|---|---|---|
| 4,954,758 | 9/1990 | Rusk | 315/411 |
| 5,276,604 | 1/1994 | Messman | 363/21 |

Primary Examiner—Theodore M. Blum
Attorney, Agent, or Firm—Burns, Doane, Swecker & Mathis, L.L.P.

[57] ABSTRACT

Protection of EHT and/or scan output stages in multiscan displays is provided without the use of additional components within the power supply other than those required to perform the power supply function itself. Operation is non-dissipative, conserving power. A drive control signal is AC coupled. The switch is on during retrace of the flyback pulse. The drive control signal is varied in accordance with the load, becoming active longer and longer periods of time with increasing load until the control signal vanishes (becomes continuously asserted), turning off the switch. In accordance with a further feature of the invention, feedback to a controlling integrated circuit concerning an overload condition may be achieved without dedicating a line or pin to a separate feedback signal.

11 Claims, 4 Drawing Sheets

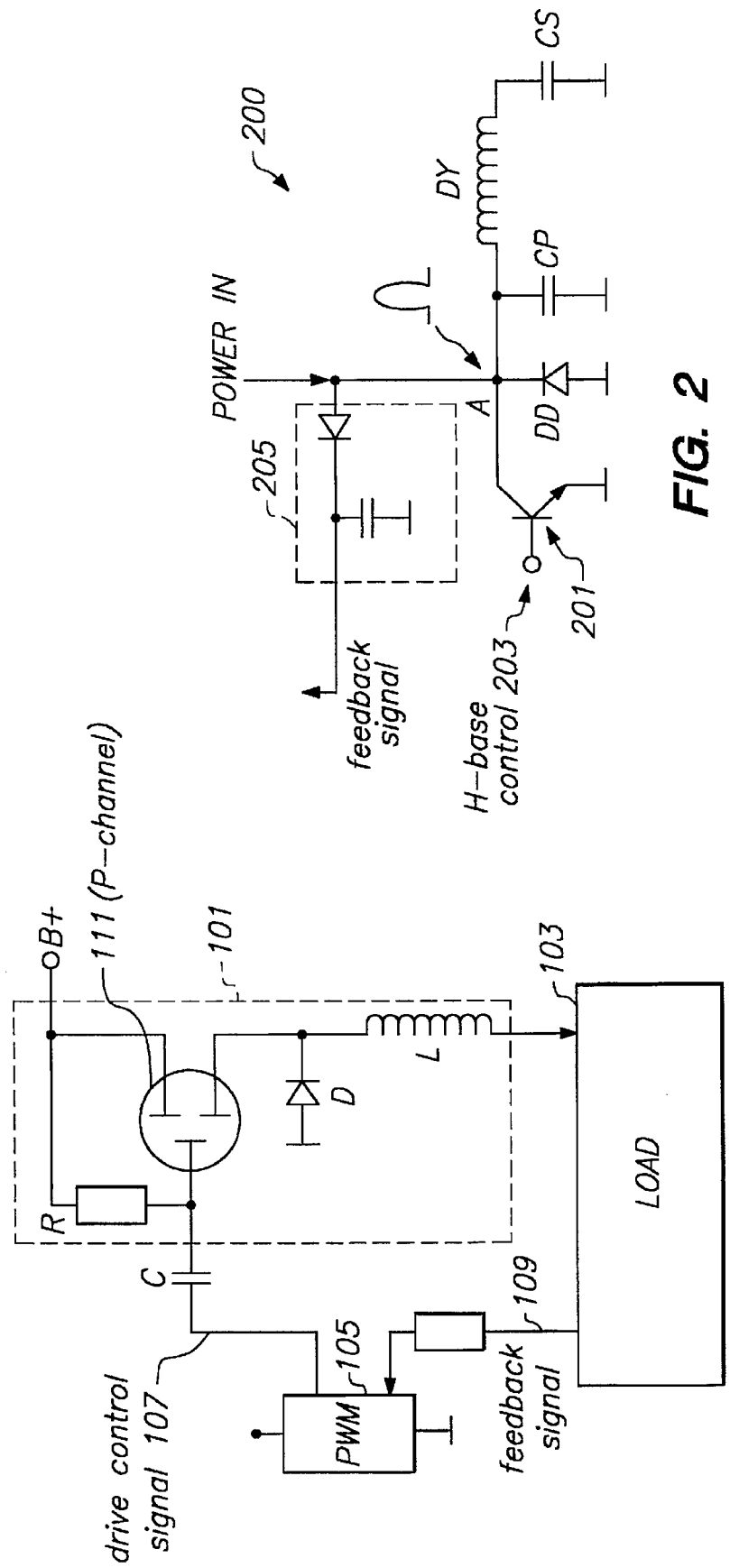

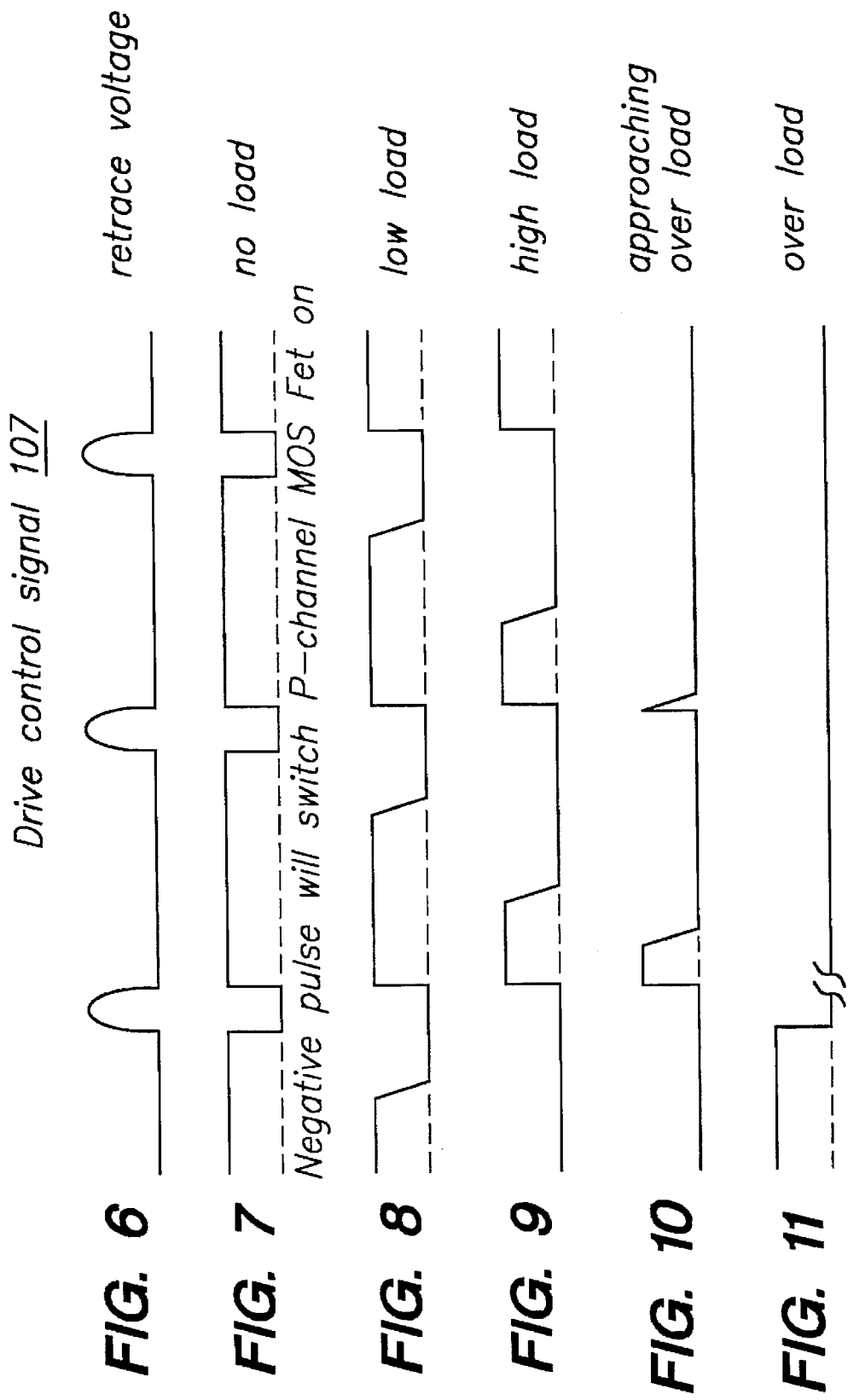

METHOD AND APPARATUS FOR PROTECTION OF EHT AND/OR SCAN OUTPUT STAGES IN MULTISCAN DISPLAYS

BACKGROUND OF THE INVENTION

1. Field of the Invention

The present invention relates to circuit protection in television and video display monitors, more particularly to protection of EHT (electrical high tension) and/or scan output stages in multiscan displays.

2. State of the Art

In television and video display monitors using a CRT (cathode ray tube), a horizontal deflection current is produced in a horizontal deflection coil to create a magnetic field used to deflect an electron beam (produced by a cathode of the CRT) back and forth across a display screen. As the electron beam is scanned back and forth across the display screen, it is modulated to produce on the display screen spots of varying luminous intensity, thus forming an image to be viewed. A high voltage, referred to as EHT (electrical high tension), is applied to an anode of the CRT and accelerates the electron beam, causing it to strike the screen at a very high speed.

Typically, a periodic horizontal drive signal is applied to a horizontal scan output stage (i.e., a power transistor) to produce a train of high-voltage retrace pulses used to generate the horizontal retrace current. The same train of retrace voltage pulses may also be used to generate the EHT using a voltage step-up transformer, commonly referred to as the flyback transformer. Where high performance is not required, as in television sets and some less-expensive video monitors, a single output stage is used to generate the horizontal retrace current and to generate the EHT, with the flyback transformer and the retrace coil being combined on a common core as part of a single assembly. In high performance video monitors, separate scan and EHT output stages are provided, with the retrace coil and the flyback transformer also being separated. Power is provided to the scan and EHT output stages from a so-called B+ power supply.

In a multiscan monitor, the horizontal drive frequency can vary between, say, 30 kHz and 80 kHz. At lower horizontal frequencies, current builds up in the primary of the flyback transformer for a longer period of time while the EHT output stage is turned on. When the EHT output stage is turned off, therefore, a larger voltage pulse is generated than in the case of a higher horizontal frequency. If the power supply to the EHT output stage were to remain the same throughout the range of possible horizontal frequencies, the EHT would then be frequency dependent, resulting in performance variations.

Furthermore, even in the case of a single horizontal frequency, variations in picture content and consequent variations in beam current may also produce variations in the EHT. For example, the top half of a picture frame might be black (no beam current) and the bottom half of the picture frame might be white (high beam current). During high beam current, the EHT is loaded down and reduced, for example by 1–2 kV. As a result, the picture becomes wider in the white are than in the black area, creating picture distortion. Therefore, it is common for the B+ power supply to the scan and EHT output stages to be varied using a step-down power supply and a control loop in order to maintain a fairly constant EHT.

Failure of certain components may cause an excessive amount of current to be drawn through the step-down power supply, possibly damaging the step-down power supply or the scan and/or EHT output stages. A well-designed circuit must provide protection in the case of such failures.

Protection of the scan and/or EHT output stage in multiscan displays is presently realized through discrete current limiting circuitry which is usually part of the power supply system. This circuitry, which often monitors current flowing through a sense resistor/current transformer, will interrupt the current if the set trigger level has been crossed. Thus, existing protection systems rely on distinct and separate circuitry, adding to the complexity and cost of the system.

SUMMARY OF THE INVENTION

The present invention, generally speaking, provides for protection of EHT and/or scan output stages in multiscan displays without the use of additional components within the power supply other than those required to perform the power supply function itself. Operation is non-dissipative, conserving power. A step-down power supply provides power to the output stage(s) and includes a switch driven by a drive control signal. The drive control signal is AC coupled. The switch is on during retrace of the flyback pulse. The drive control signal is varied in accordance with the load, becoming active for longer and longer periods of time with increasing load until the control signal vanishes (becomes continuously asserted), turning off the switch. In accordance with a further feature of the invention, feedback to a controlling integrated circuit concerning an overload condition may be achieved without dedicating a line or pin to a separate feedback signal.

BRIEF DESCRIPTION OF THE DRAWING

The present invention may be further understood from the following description in conjunction with the appended drawing. In the drawing:

FIG. 1 is a schematic diagram of an EHT/Scan power supply circuit in accordance with one embodiment of the invention;

FIG. 2 is a schematic diagram of one possible load, namely a scan circuit;

FIG. 6 is a timing diagram showing a retrace voltage wave form;

FIG. 7 is a timing diagram showing the drive control signal of FIG. 1 under a no load condition;

FIG. 8 is a timing diagram showing the drive control signal of FIG. 1 under a low load condition;

FIG. 9 is a timing diagram showing the drive control signal of FIG. 1 under a high load condition;

FIG. 10 is a timing diagram showing the drive control signal of FIG. 1 under a near overload load condition; and FIG. 11 is a timing diagram showing the drive control signal of FIG. 1 under an overload condition.

DETAILED DESCRIPTION OF THE PREFERRED EMBODIMENTS

Figure 3:
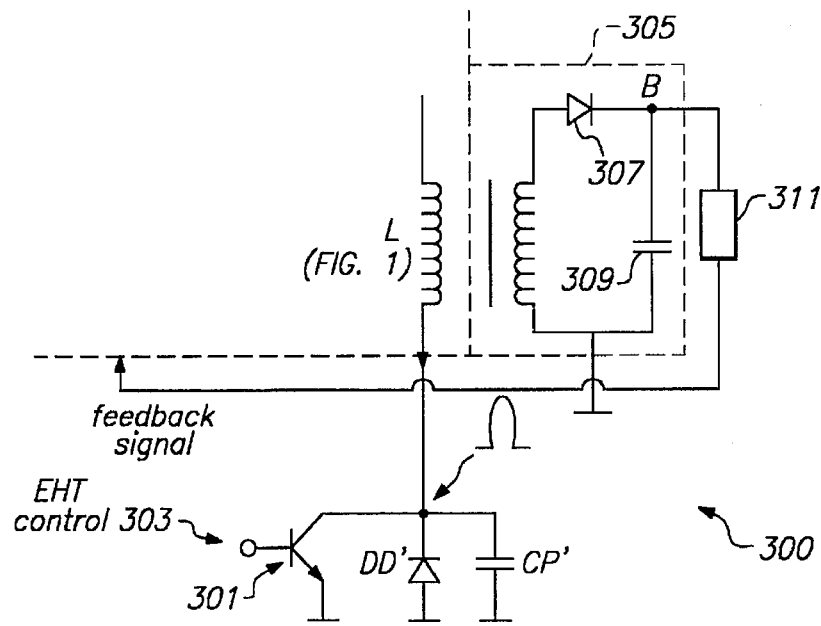
FIG. 3 is a schematic diagram of another possible load, namely an EHT circuit.

The present protection scheme is incorporated into the control drive scheme of a step-down power supply, or buck-converter, which controls the power supply voltage of a Scan/EHT output transistor.

The timing of a gate drive control signal is designed to keep a switch transistor (in this case a P-channel MOSFET) on during the horizontal retrace interval, even without any load current, and if the load current increases, to allow for a longer on-time by advancing the leading negative edge towards the positive edge of the previous completed retrace cycle.

With further increased load current, the advancing negative edge will reach the positive edge from the retrace cycle, causing both to finally disappear. The drive signal is AC coupled, and after the discharge of the coupling capacitor the switch transistor will be off and the current path will be interrupted. The time constant of the coupling path can be chosen to provide a relatively faster or slower response.

This arrangement will shut down the power supply completely in the ease of severe and persistent overload, which could damage the power supply and its load.

Additionally, the drive control circuit (preferably an integrated circuit) is able to detect an overload condition through the absence of a drive signal and response appropriately, thereby providing a sophisticated protection scheme, not only for the Scan, EHT and power supply output stages but also for preventing excessive X-ray radiation and beam current.

Referring now to FIG. 1, there is shown a step-down power supply 101 connected to a load 103. The step-down power is controlled by a pulse width modulator 105 that produces a drive control signal 107 in response to feedback signal 109 from the load. The step-down power supply includes a switch 111 (e.g., a P-channel MOSFET) connected, in this instance, to a B+ power supply, a resistor R connected between the gate and the drain of the MOSFET, and a coil L and a free-wheeling diode D connected to the source of the MOSFET. Such a step-down power supply is well known.

The drive control signal produced by the pulse width modulator is coupled to the gate of the MOSFET through a capacitor C for reasons that will shortly become apparent.

Referring to FIG. 2, the load 103 of FIG. 1 may be a scan circuit 200 as shown. A scan output stage 201 (e.g., a bipolar power transistor) is connected between a power input (POWER IN from the step-down power supply 101 of FIG. 1) and ground and is controlled by an H-base control signal 203. Also connected to the power input are a damping diode DD, a flyback CP, and a horizontal deflection coil DY. Connected between an opposite end of the horizontal deflection coil and ground is an S capacitor, CS. The scan circuit 200 as thus-far described is well-known in the art.

The scan circuit 200 also includes a peak voltage detector 205. The peak voltage detector 205 detects the peak voltage of a retrace pulse occurring at node A and feeds back a proportional voltage to the pulse width modulator 105 in FIG. 1.

Referring to FIG. 3, instead of or in addition to the scan circuit 200 of FIG. 2, the load 103 of FIG. 1 may be an EHT circuit 300 as shown. An EHT output stage 301 (e.g., a bipolar power transistor) is connected between the inductor L of the step-down power supply 101 of FIG. 1 and ground and is controlled by an EHT control signal 303. Also connected to the power input from the inductor L are a damping diode DD', and a flyback capacitor CP'. Inductively coupled to the inductor L is the secondary portion 305 of a flyback transformer formed by the secondary portion 305 and the inductor L. The secondary portion includes a diode rectifier 307 and a storage capacitor 309. The EHT circuit 300 as thus far described is well-known in the art.

The EHT circuit 300 also includes a resistor 311 used to monitor the voltage at node B. A proportional voltage is fed back to the pulse width modulator 105 in FIG. 1.

Figure 4:
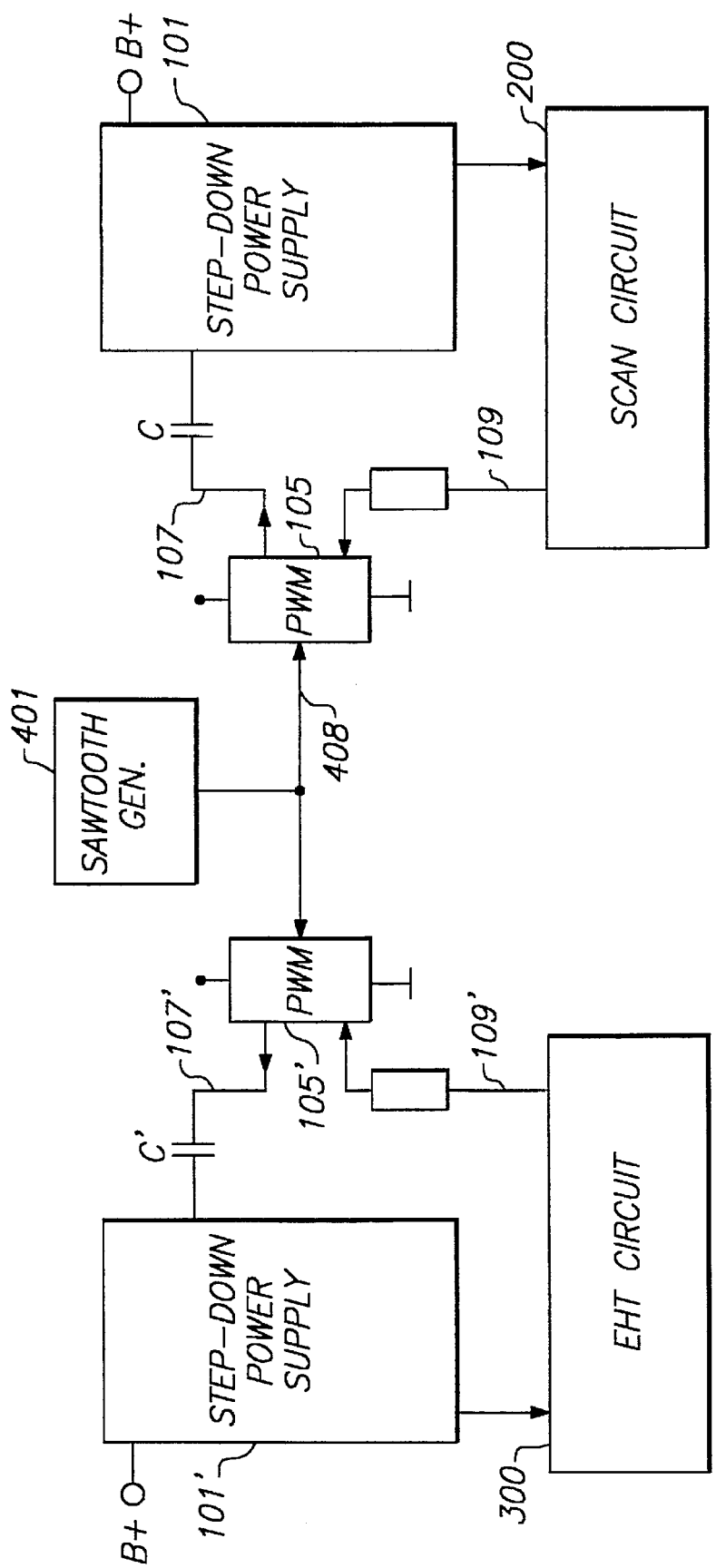
FIG. 4 is a block diagram of a combined EHT/Scan power supply circuit.

As shown in FIG. 4, the scan circuit 200 and the EHT circuit 300 are driven by separate pulse width modulators 105 and 105', which respond to respective loop/feedback signals to produce scan and EHT control signals 107 and 107'. In operation, the scan control signal could have reached momentarily steady state, while the EHT control signal is varying widely in order to compensate for large beam current variations due to picture content (bright to dark).

The scan and EHT control signals 107 and 107' will, however, follows the same principal timing and exhibit like waveforms, such that the pulse width modulators may share a common sawtooth waveform generator 401 in FIG. 4. The sawtooth waveform generator 401 produces a sawtooth signal 408 which is input to respective pulse width modulators 105 and 105'. As noted previously, for performance reasons, separate step-down power supplies 402 and 403 are provided for the respective loads 200 and 300.

The sawtooth generator 401 generates one of the three input signals needed for the respective PWMs. The other two signals are the feedback signal and a reference voltage. To save one sawtooth generator is a significant cost/part reduction. The sawtooth generator 401 must generate a sawtooth signal 402 which is frequency dependent (to compensate for loop gain variation over frequency) as well as voltage independent (to allow for start up of the system from almost zero fly back voltage).

The loop gain is higher at low frequency that at high frequency. In order to compensate for this variation, the amplitude of the sawtooth signal is reduced at higher frequencies. The foregoing requirement renders the sawtooth generator circuitry complex. Sharing a single sawtooth generator therefore provides a significant cost saving.

Figure 5:
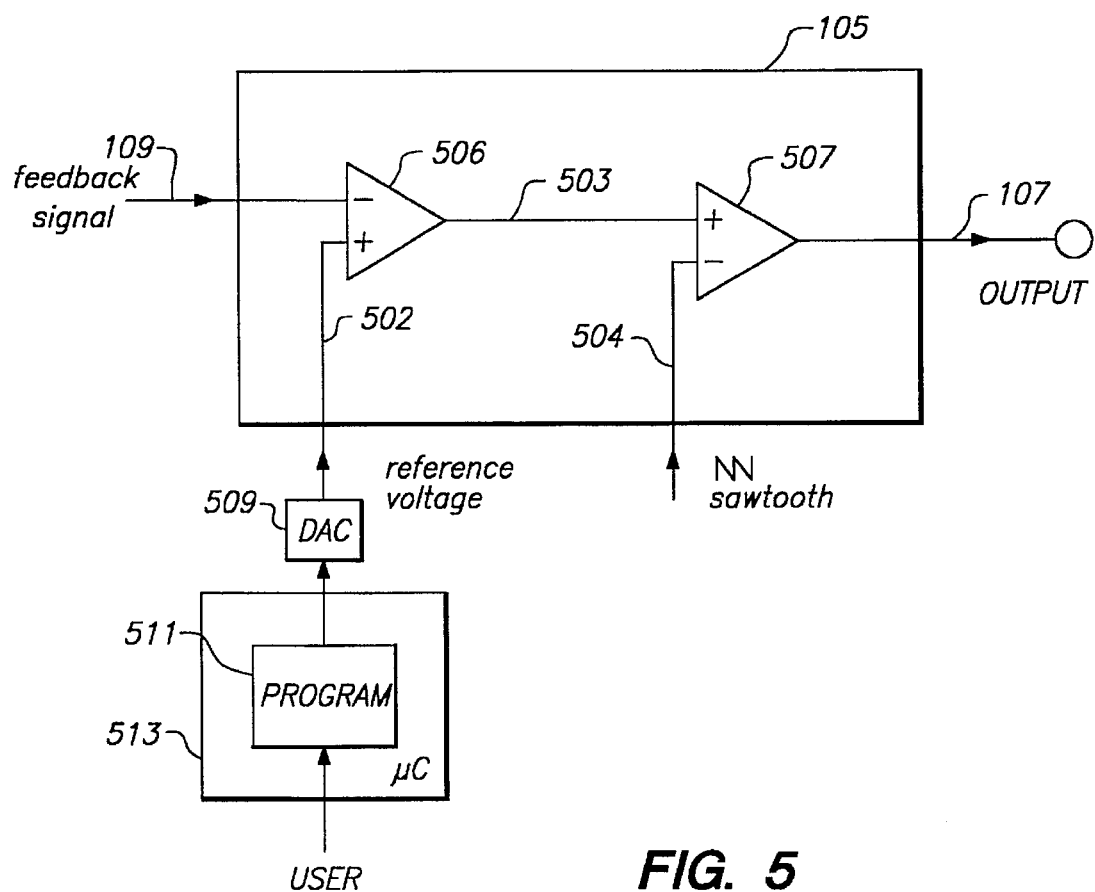
FIG. 5 is a schematic diagram of a portion of the pulse width modulator of FIG. 1.

The pulse width modulator 105 of FIG. 1 is shown in greater detail in FIG. 5. The feedback signal 109 is supplied to a negative input of a difference op amp 506 and is compared to a reference voltage supplied to a positive input 502 of the difference op amp. The difference op amp 506 produces a difference signal 503 representing the difference between the reference voltage and the feedback voltage. The difference signal 503 is input to a positive input of a comparator 507. A sawtooth waveform is input to a negative input 504 of the comparator 507.

The sawtooth waveform will have some peak-to-peak voltage range. When the difference signal 503 is within this range, the drive control signal 107 will be driven low when the sawtooth waveform transitions positively through the voltage level of the difference signal 503, and will be driven high when the sawtooth waveform transitions negatively through the voltage level of the difference signal 503. When the difference signal 503 exceeds the peak voltage of the sawtooth (i.e., the feedback signal is low compared to the reference voltage), the drive control signal 107 will be driven high and will remain high until the difference signal decreases.

The reference voltage is adjusted by a program 511 running within a microcontroller 513. The microcontroller receives an input signal from a user and processes the input signal in accordance with the program to produce a number representative of the desired reference voltage, which is then converted to an analog voltage by a DAC 509. The program may adjust the reference voltage in response to the user input, operating mode, operating conditions, etc. In any event, the PWM will cause the scan current to proportionally track the reference voltage.

For example, if the user adjusts the picture width, the result is to adjust the reference voltage, whereby the scan current will be increased or decreased. If more scan current is required for a particular mode, then the microcontroller will set the reference voltage higher.

When the reference voltage is increased, the PWM duty cycle will also increase but only within a design range. However, if excess current is necessary to generate the required scan current, then the PWM will increase the duty cycle up to a point where the pulses will finally disappear, stopping the PWM and removing power from the load. Such an overload condition may be caused by a resettable condition (latch up of microcontroller, arcing inside the tube, locking at wrong horizontal frequencies during mode change transitions, etc.) or a non-resettable condition such as a faulty component.

The timing regime of the sawtooth generator 401 and hence of the pulse width modulator 105 is governed by the occurrence of periodic retrace pulses, shown in FIG. 6. Operation of the pulse width modulator 105 is illustrated under various load conditions in FIG. 7 though FIG. 11.

Referring to FIG. 7, during and substantially throughout each retrace pulse, the drive control signal 107 is asserted even under no load conditions, creating a negative pulse at the gate of the P-channel MOSFET 111 so as to turn the MOSFET on. The negative pulse produced during no load (retrace) is needed to ensure zero current switching of the output stage 201 and/or 301. Also, for the EHT output stage 301, in order to achieve better EHT regulation, it is advisable to have the flyback transformer terminated (grounded) during the flyback time, which coincides essentially with the generation of the high voltage.

The trailing edge of the negative pulse is always fixed to coincide with the falling edge of the retrace pulse. The leading edge of the negative pulse, however, is shifted by the pulse width modulator 105 in accordance with load conditions.

In particular, as the load on the step-down power supply 101 increases, as determined by the voltage at node A or at node B, for example, the leading edge of the negative pulse is advanced. Referring therefore to FIG. 10, whereas under no load conditions the duty cycle of the drive control signal is perhaps X%, under low load conditions, the leading edge of the negative pulse is advanced to where the duty cycle of the drive control signal becomes, say, Y%.

Note that, in contrast with prior art overload protection arrangements, monitoring does not require the use of a series-connected current-monitoring resistor, which consumes additional power.

As the load continues to increase, so does the duty cycle of the drive control signal. As seen in FIG. 9, under high load conditions, the duty cycle is also high, say Z%.

Of course, the duty cycle of the drive control signal can only be increased to 100%. This condition occurs upon overload. As the circuit approaches overload (FIG. 10), the duty cycle of the drive signal draws nearer and nearer to 100% until the pulse vanishes and the drive control signal is asserted low continually (FIG. 11). Since the drive control signal is capacitively coupled to the P-channel MOSFET 111, the now DC drive control signal will not reach the base of the P-channel MOSFET 111 to turn it on. Power will therefore have been withdrawn from the circuit.

To take a concrete example, assume that an overload condition occurs in the EHT output circuit. The sawtooth waveform input to the EHT PWM, because it is generated based on the H-base control signal 203, is still present upon occurrence of an overload.

As the drive duty cycle approaches 100%, the drive control signal will vanish (become DC) and hence withdraw the drive signal to the gate of the MOSFET. The input feedback signal to the PWM will go from some nominal value to a low level. That is, since power will have been withdrawn, no EHT voltage will be generated, and the feedback signal will be low. The input reference signal, however, will still be positive, as it is set the to the value needed for normal operation. As a result, the output signal from the PWM will be high.

The described protection scheme is a local protection scheme in that overload causes only the relevant stage (scan or EHT) to be shut down. Accordingly, the system is able to recover very quickly from an overload condition as compared to conventional arrangements in which all output supply lines from the main power supply are shut down. Recovery in such an arrangement takes much longer.

A time constant determined by the capacitor C and the resistor R in FIG. 1 may be adjusted to control how quickly power is withdrawn following occurrence of an overload condition.

The value RC should be selected so as to ensure that, at the longest duty cycle (lowest frequency, maximum power) the gate drive of the transistor 111 will not be affected. At higher frequencies, more cycles of no pulses are required before the protection feature will be triggered. However, at high frequencies, the current going into the load is lower and hence the need for protection is not as great.

Assuming an input drive pulse of 10V, a minimum gate threshold voltage for the transistor 111 of 2.5V, and a maximum gate threshold voltage of 5V, values of R and C and the number of horizontal pulses required to trigger the protection scheme at low and high frequencies may be derived form the following relations.

$$V_c = V(1 - exp(-t/T)); V_c/V = 0.5,$$

where T=RC. The latter equation reflects that with the longest possible on time (at 30 kHz, 1/f=33 µs, the longest possible duty cycle plus the retrace period), the gate pulse should not fall below 5V.

Typical values are shown in Table 1:

| R | C | f | Delay (xH) |
|---|---|---|---|
| 4.7 kΩ | 10nf | 30kHz | 2.0 |
| 4.7 kΩ | 10nf | 80kHz | 5.2 |

Once the protection scheme has been triggered, shutdown of power will continue indefinitely. The PWM can only be reset by pulling the reference input to low. This reset operation may be performed by a controller (e.g., a control integrated circuit including the PWMs, the sawtooth generator, and other control circuitry) after some number of retrace cycles have elapsed, providing an opportunity for the overload condition to correct itself if possible. The control IC is able to detect overload and normal conditions by internally sensing the PWM input and output signals. Hence, by pulling the reference voltage to low, the IC can automatically restart the power up cycle after a detected overload condition.

More sophisticated overload protection schemes are readily facilitated through the foregoing ability of the IC to sense an overload condition. Such protection schemes may include protection for excessive beam current, excessive X-ray radiation, etc.

It will be appreciated that the present invention can be embodied in other specific forms without departing from the spirit or essential character thereof. The disclosed embodiments are therefore considered in all respects to be illustrative and not restrictive. The scope of the invention is indicated by the appended claims, and all changes which come within the meaning and range of equivalents thereof are intended to be embraced therein.

What is claimed is:

1. For use in a video monitor having a coil, and having a voltage source connected to said coil and a first electronic switch connected to said coil such that, while the first electronic switch is closed, an increasing current flows through the coil, and having a signal comprising periodic retrace pulses coupled to the first electronic switch for periodically opening the first electronic switch, a protection circuit comprising:

a second electronic switch connected between said voltage source and said coil;

means for capacitively coupling to the second electronic switch a drive control signal which, when asserted, causes the second electronic switch to be closed;

means for monitoring an electrical parameter indicative of a current through said coil; and control means responsive to said means for monitoring for increasing a duty cycle of the drive control signal as the current through said coil increases, said drive control signal being continually asserted when the current through said coil, as indicated by said electrical parameter, increases beyond a threshold value;

wherein the means for capacitively coupling the drive control signal blocks the drive control signal when it is continually asserted, causing the second electronic switch to be turned off, and wherein said coil is one of a horizontal deflection coil and a high voltage transformer primary coil.

2. The apparatus of claim 1 wherein said means for capacitively coupling comprises a capacitor having one plate thereof coupled to the drive signal and another plate thereof coupled through a resistor to said voltage source.

3. The apparatus of claim 2 wherein values of the capacitor and the resistor determine a time constant in accordance with which the second electronic switch is turned off.

4. The apparatus of claim 1, wherein said means for capacitively coupling prevents said drive control signal, when said drive control signal is continually asserted, from closing said second electronic switch.

5. The apparatus of claim 4, wherein said control means is also for decreasing the duty cycle of the drive control signal as the current through said coil decreases.

6. The apparatus of claim 5, wherein said control means comprises a difference comparator and a pulse width modulator.

7. The apparatus of claim 6, wherein said pulse width modulator comprises a sawtooth waveform generator that generates a periodic sawtooth waveform each period of which comprises a relatively steep rising portion followed by a more gradual falling portion.

8. The apparatus of claim 7, wherein said sawtooth waveform generator is synchronized with said periodic retrace pulses.

9. The apparatus of claim 7, wherein, as a result of a characteristic of said periodic sawtooth waveform, said control means asserts said drive control signal during each retrace pulse.

10. The apparatus of claim 9, wherein said control means asserts said drive control signal substantially throughout each retrace pulse.

11. The apparatus of claim 7, wherein said control means comprises means for detecting when said drive control signal is continuously asserted.

* * * * *